United States Patent

Noba et al.

[11] Patent Number: 5,971,330
[45] Date of Patent: Oct. 26, 1999

[54] STRUCTURE FOR ATTACHING A RUBBER-MADE COMPONENT PART

[75] Inventors: Katsuhiko Noba, Hokkaido; Hidetoshi Sato, Shizuoka, both of Japan

[73] Assignee: Yazaki Corporation, Tokyo, Japan

[21] Appl. No.: 09/110,396

[22] Filed: Jul. 6, 1998

[30] Foreign Application Priority Data

Jul. 4, 1997 [JP] Japan ..................................... 9-179846

[51] Int. Cl.⁶ ....................................................... F16L 3/00
[52] U.S. Cl. ................................ 248/73; 248/56; 248/71; 403/329
[58] Field of Search ................................. 248/53, 56, 73, 248/71, 68.1, 229.16, 229.26, 228.7, 316.7; 403/329

[56] References Cited

U.S. PATENT DOCUMENTS

| | | | |
|---|---|---|---|
| 4,700,913 | 10/1987 | Hirano et al. ............................... | 248/73 |
| 5,328,288 | 7/1994 | Masuda ..................................... | 403/329 |
| 5,505,411 | 4/1996 | Heaton et al. ........................... | 248/73 X |

FOREIGN PATENT DOCUMENTS

8-331732  12/1996  Japan ................................ H02G 3/22

*Primary Examiner*—Ramon O. Ramirez
*Attorney, Agent, or Firm*—Sughrue, Mion, Zinn, MacPeak & Seas, PLLC

[57] ABSTRACT

A structure for attaching a rubber-made component part to a panel in association with a clip engaging portion of the panel, includes: a body of the rubber-made component part having a clip embedding hole and a stopper insertion hole which communicate with each other; and an attaching clip formed of a synthetic resin and having one end portion insertable in the clip embedding hole and the other end portion projecting from a surface of the body. A stopper engaging portion is formed on the one end portion of the attaching clip, and a panel engaging portion is formed on the other end portion of the attaching clip. A stopper is insertable into the stopper insertion hole, and is adaptable to engage with the stopper engaging portion of the attaching clip so that the attaching clip is retained in the clip embedding hole. The panel engaging portion of the attaching clip is engaged with the clip engaging portion of the panel when the rubber-made component part is attached to the panel.

16 Claims, 7 Drawing Sheets

STRUCTURE FOR ATTACHING A RUBBER-MADE COMPONENT PART

BACKGROUND OF THE INVENTION

1. Field of the Invention

This invention relates to a structure for attaching a rubber-made component part, and more particularly to an attaching structure applicable to a rubber-made component part for an automobile, including such as a grommet, or various other rubber-made component parts.

The present application is based on Japanese Patent Application No. Hei. 9-179846, which is incorporated herein by reference.

2. Description of the Related Art

Figure 7:
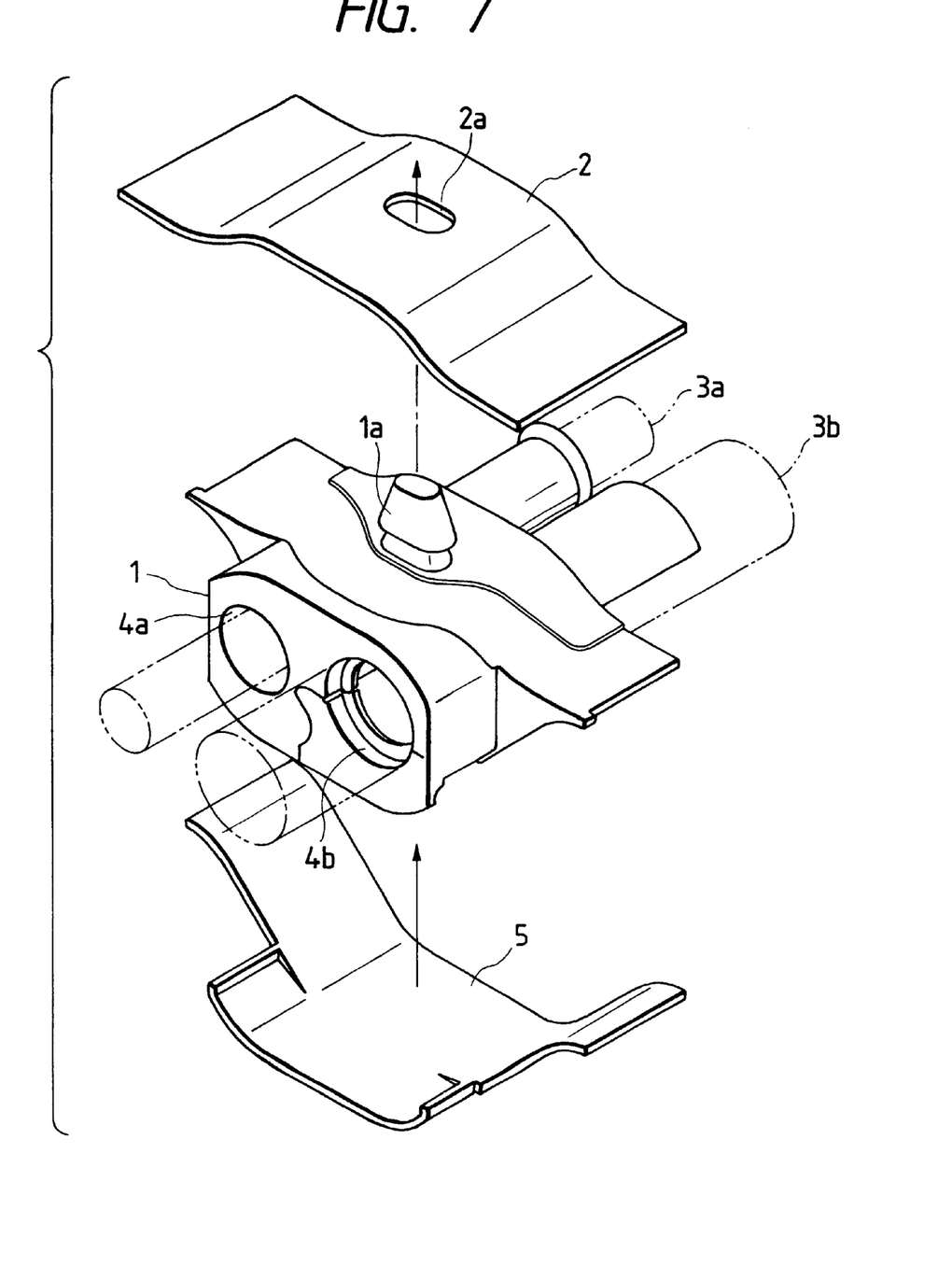
FIG. 7 is an exploded perspective view illustrating a conventional structure for attaching a grommet.
Figure 8A:
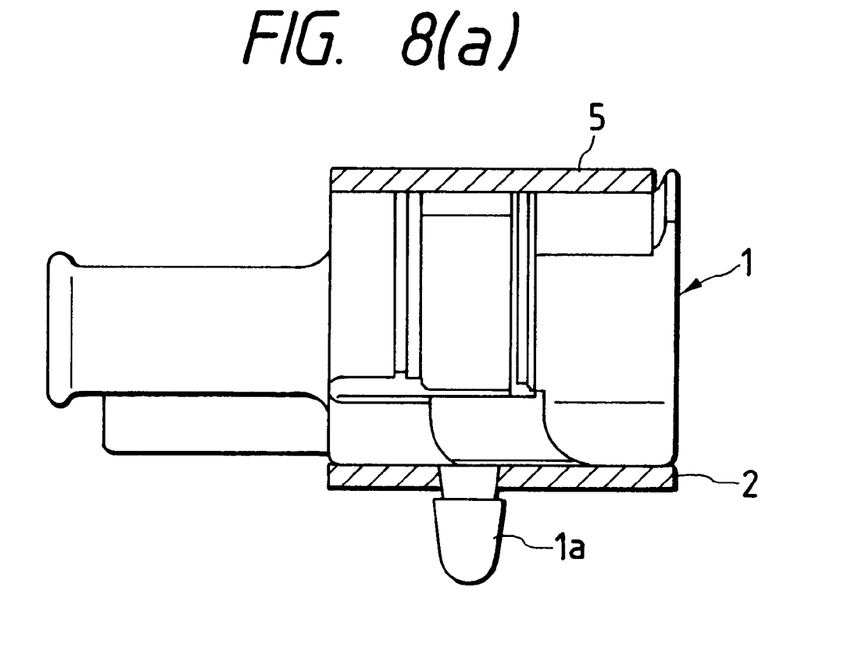

As a conventional structure for attaching a rubber-made component part, a structure is known in which, as shown in FIG. 7, a rubber-made grommet 1 having a clip 1a for attachment on a vehicle body formed integrally therewith is attached to a vehicle body panel 2. FIG. 7 is a perspective view in which the clip 1a for attachment on a vehicle body is shown facing up for ease of description. As shown in the drawing, the grommet 1 is attached by fitting the clip 1a for attachment on a vehicle body into a clip fitting hole 2a formed in the vehicle body panel 2. As shown in the drawing, a pair of insertion holes 4a and 4b are formed in this grommet 1, and a pair of wire harnesses 3a and 3b are respectively inserted in the insertion holes 4a and 4b. A protector panel 5 is provided in such a manner as to press the grommet 1 attached to the vehicle body panel 2 against the panel 2. FIG. 8(a) shows a normal state in which the attachment is completed.

Figure 8B:
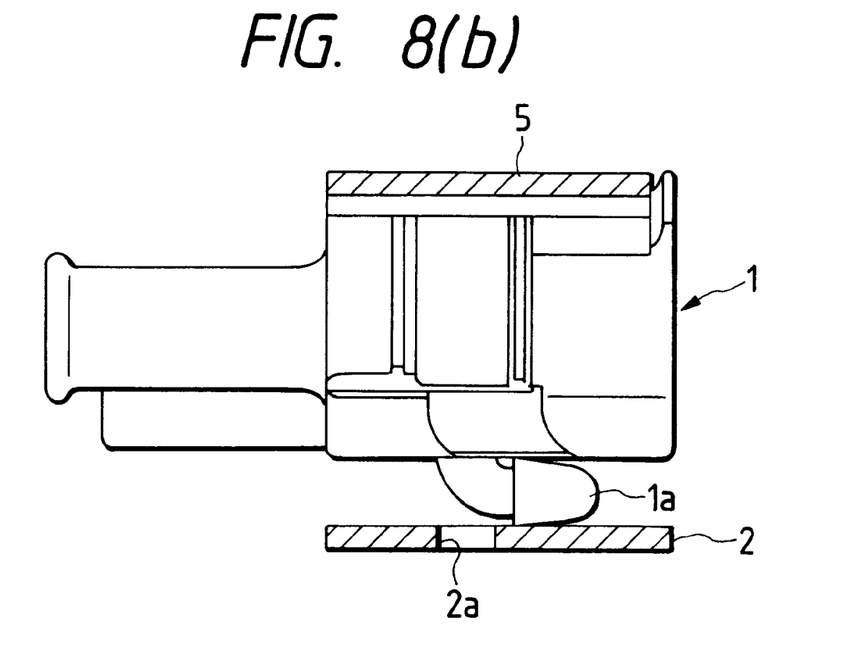
FIG. 8(b) is a cross-sectional view illustrating an abnormal state of the conventional structure for attaching a grommet.

However, with the above-described attaching structure, the following problems are encountered. That is, there is a problem in that since the rubber-made clip 1a for attachment on a vehicle body is flexible, the retaining force derived from the clip 1a is small. In addition, there is a problem in that when an operator fits the clip 1a for attachment on a vehicle body into the clip fitting hole 2a in the vehicle body panel 2, it is difficult to ascertain whether or not the fitting has been effected positively. In particular, if the clip 1a for attachment on a vehicle body abuts against the vehicle body panel 2 before it is guided into the clip fitting hole 2a, since the clip 1a for attachment on a vehicle body is flexible, the clip 1a for attachment on a vehicle body is liable to assume an abnormal state in which it is bent, as shown in FIG. 8(b). Since it is difficult to ascertain whether or not the clip 1a for attachment on a vehicle body has been fitted positively in the clip fitting hole 2a, it sometimes happens that the protector panel 5 is pressed against the grommet 1 in the state in which the clip 1a for attachment on a vehicle body is bent. In a case where such attachment is performed, if some force acts on the wire harnesses 3a and 3b, there arises the problem that the grommet 1 is disengaged from between the vehicle body panel 2 and the protector panel 5.

With the conventional attaching structure, the above-described problems exist due to the fact that the clip 1a for attachment on a vehicle body of the grommet 1 is formed of elastic rubber. Accordingly, it is conceivable to form, for example, a synthetic resin-made clip for attachment on a vehicle body on the rubber-made grommet by insert molding. In this case, however, burrs for hampering the function of the clip are produced around the synthetic resin-made clip for attachment on a vehicle body. For this reason, the step of a debarring operation becomes necessary, which results in an increase in the number of manufacturing steps, so that a problem remains in the mass production efficiency. In addition, in a case where such insert molding is effected, the structure of a mold becomes complex, so that there is a problem in that the cost becomes higher.

SUMMARY OF THE INVENTION

Accordingly, it is an object of the present invention to provide an attaching structure which excels in the efficiency in the operation of attaching a rubber-made component part, and which yields a high effect in the prevention of the rubber-made component part from coming off.

According to the first aspect of the present invention, there is provided a structure for attaching a rubber-made component part to a panel in association with a clip engaging portion of the panel, comprises:

a body of the rubber-made component part including a clip embedding hole and a stopper insertion hole which communicate with each other;

an attaching clip formed of a synthetic resin and having one end portion insertable into the clip embedding hole and the other end portion projecting from a surface of the body when the one end portion is inserted into the clip embedding hole;

a stopper engaging portion formed on the one end portion of the attaching clip;

a panel engaging portion formed on the other end portion of the attaching clip; and a stopper insertable into the stopper insertion hole, and adaptable to engage with the stopper engaging portion of the attaching clip, wherein the panel engaging portion of the attaching clip is engaged with the clip engaging portion of the panel when the rubber-made component part is attached to the panel. In the structure, it is possible to prevent the attaching clip from coming off by a simple manipulating operation in which the attaching clip formed of a synthetic resin is inserted in the clip embedding hole formed in the rubber-made component part and by inserting the stopper into the stopper insertion hole. In addition, since the attaching clip which is engaged in the panel to be attached to is formed of a synthetic resin, it is possible to improve the retaining force for fixing the rubber-made component part to the panel to be attached to, thereby making it possible to obtain a reliable attaching structure.

According to the second aspect of the present invention, in the structure for attaching the rubber-made component part according to the first aspect of the present invention, the rubber-made component part is a grommet. In accordance with the second aspect of the present invention, it is possible to improve the operating efficiency in attaching the grommet and reliability of the attachment.

According to the third aspect of the present invention, the structure for attaching the rubber-made component part according to the first or second aspect of the present invention further comprises a stopper receiving portion, into which the stopper is insertable, formed in the stopper engaging portion of the attaching clip. In accordance with the third aspect of the present invention, it is possible to prevent the attaching clip from coming off by a simple operation in which the stopper is inserted into the stopper receiving portion, thereby making it possible to improve the operating efficiency.

According to the fourth aspect of the present invention, in the structure for attaching the rubber-made component part according to any one of the first to third aspects of the present invention, the panel is a vehicle body panel. In accordance with the fourth aspect of the present invention, the rubber-made component part can be supported easily with respect to the vehicle body panel with a high retaining force.

According to the fifth aspect of the present invention, in the structure for attaching the rubber-made component part according to any one of the first to fourth aspects of the present invention, the clip engaging portion of the panel is an opening portion. In accordance with the fifth aspect of the present invention, the rubber-made component part can be attached to the panel by inserting into the opening portion the panel engaging portion of the attaching clip fitted in the rubber-made component part.

According to the sixth aspect of the present invention, in the structure for attaching the rubber-made component part according to the fifth aspect of the present invention, the panel engaging portion of the attaching clip has a resilient piece which, when inserted into the opening portion, is press-fitted into the opening portion, and spreads out after the insertion. In accordance with the sixth aspect of the invention, the panel engaging portion of the attaching clip can be easily engaged by the operation of pushing the panel engaging portion into the opening portion of the panel. For this reason, whether or not the attaching clip formed of the synthetic resin has been fitted in the opening portion can be confirmed by the clicking sound of the resilient piece, thereby permitting reliable attachment.

According to the seventh aspect of the present invention, in the structure for attaching the rubber-made component part according to any one of the first to sixth aspects of the present invention, a coming-off preventing plate portion which abuts against and engages a rear end, in a stopper-inserting direction, of the stopper is formed integrally with the opening portion of the stopper insertion hole. In accordance with the seventh aspect of the present invention, since the coming-off preventing plate portion formed at the opening portion of the stopper insertion hole prevents the stopper from coming off, it is possible to prevent the disengagement between the attaching clip and the stopper, thereby making it possible to reliably attach the rubber-made component part to the panel.

The above and other objects, features and advantages of the present invention will become more apparent from the following detailed description of the invention when read in conjunction with the accompanying drawings.

BRIEF DESCRIPTION OF THE DRAWINGS

FIG. 8 (a) is a cross-sectional view illustrating a normal state of the conventional structure for attaching a grommet.

DETAILED DESCRIPTION OF THE PREFERRED EMBODIMENT

Referring now to the accompanying drawings, a detailed description will be given of the structure for attaching a rubber-made component part in accordance with an embodiment of the present invention.

Figure 1:
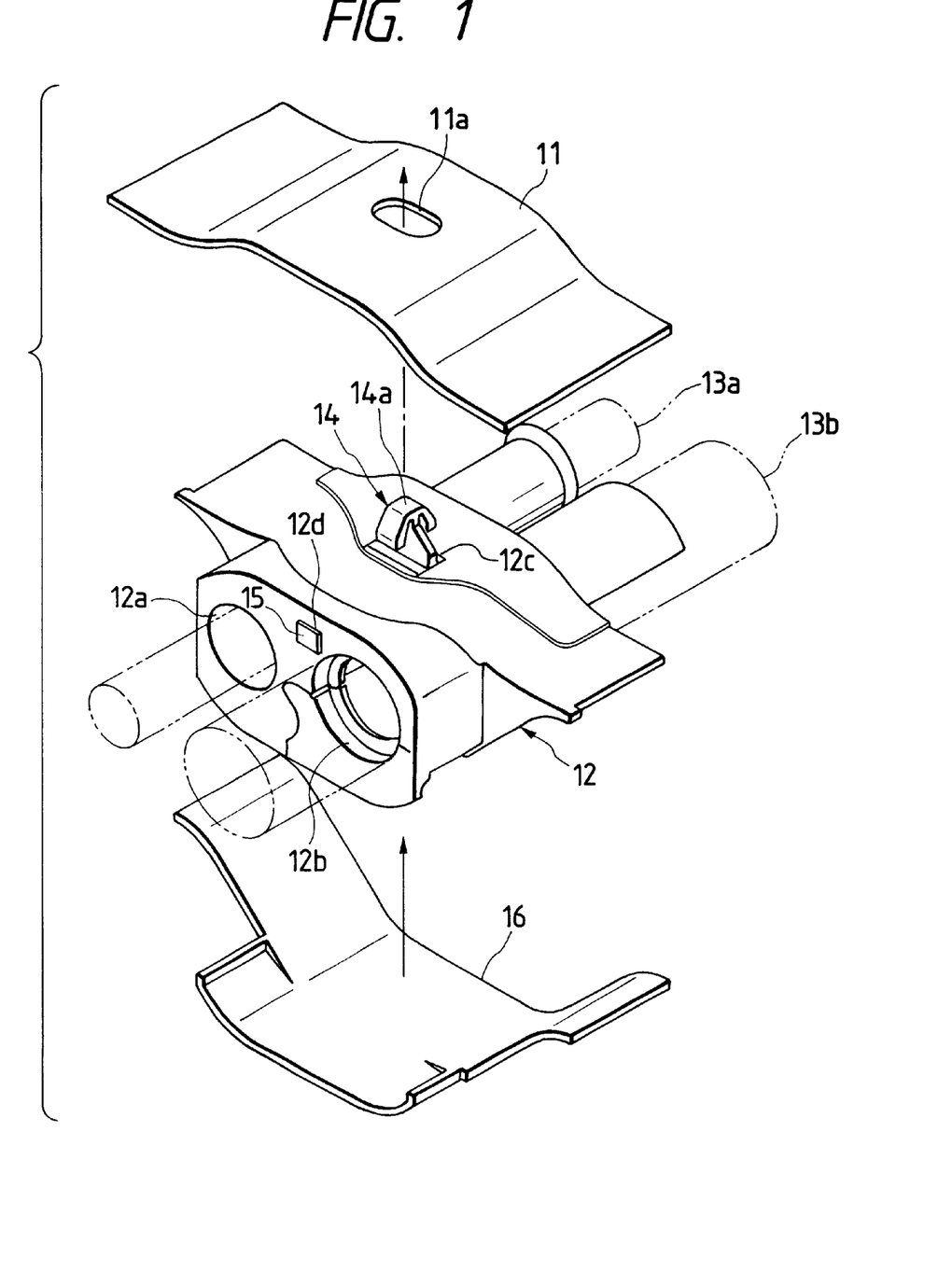
FIG. 1 is an exploded perspective view illustrating embodiment of the structure for attaching a rubber-made component part in accordance with the present invention.
Figure 2:
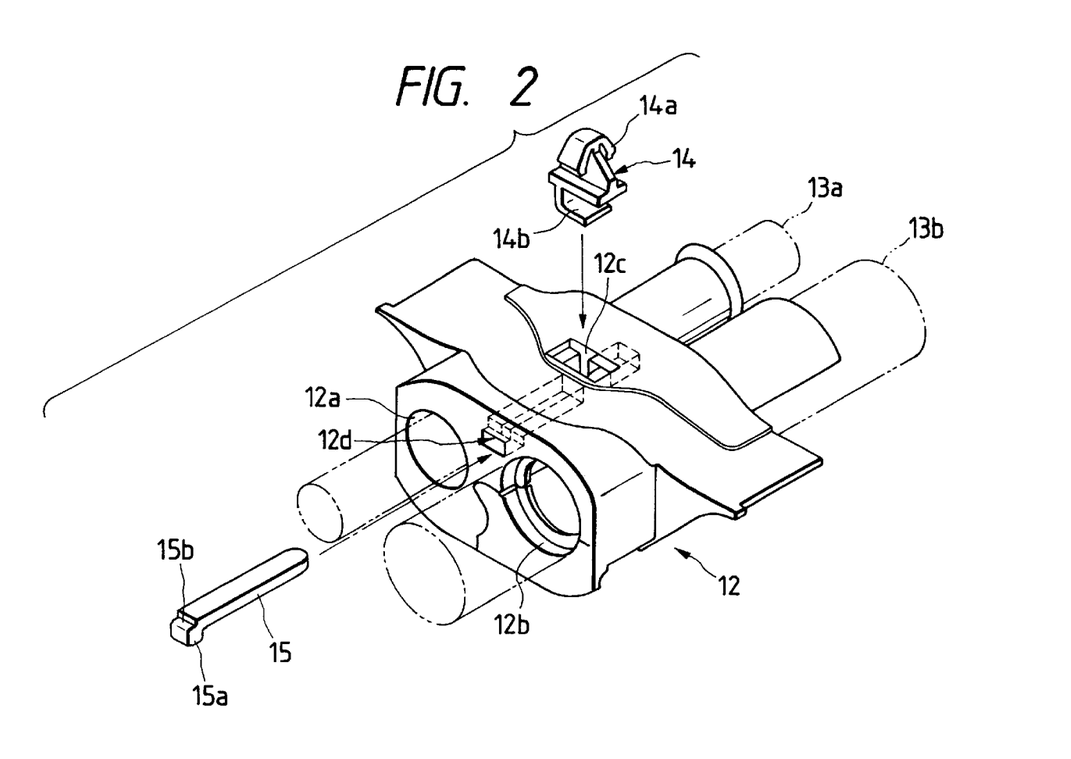
FIG. 2 is a perspective view illustrating a state in which an attaching clip and a stopper in accordance with this embodiment are being fitted in a grommet.

First, referring to FIGS. 1 and 2, a description will be given of an outline of the attaching structure in accordance with this embodiment. It should be noted that FIG. 1 is an exploded perspective view illustrating the embodiment in which the structure for attaching a rubber-made component part in accordance with the present invention is applied to a case where the rubber-made component part is a grommet. FIG. 2 is a perspective view illustrating a state in which an attaching clip and a stopper are being fitted in the grommet.

As shown in FIGS. 1 and 2, in the structure for attaching a rubber-made component part in accordance with this embodiment, a clip engaging hole 11a is formed in a partition wall-side panel 11 (hereafter referred to as the vehicle body panel) 11 for partitioning a vehicle compartment from an engine compartment or a trunk compartment and serving as a panel to be attached to. It should be noted that openings for allowing wire harnesses, which will be described later, to be passed therethrough are formed in the vehicle body panel. In addition, reference numeral 12 denotes a grommet as a rubber-made component part, and a pair of harness fitting holes 12a and 12b for respectively fitting and supporting a pair of wire harnesses 13a and 13b are formed in the grommet 12. A clip embedding hole 12c, which is formed in a direction substantially perpendicular to the axial direction of each of the fitting holes 12a and 12b, is formed in a lateral surface of the grommet 12 at a position located laterally of a portion between the harness fitting holes 12a and 12b. An attaching clip 14 formed of a synthetic resin is inserted in this clip embedding hole 12c. Further, a stopper insertion hole 12d, into which a synthetic resin-made stopper 15 is inserted, is formed in the grommet 12 in such a manner as to extend in a direction perpendicular to the inserting direction of the clip 14, i.e., in a direction substantially parallel with the axial direction of each of the harness fitting holes 12a and 12b, and in such a manner as to communicate with the clip embedding hole 12c in its innermost portion. At an opening edge of this stopper insertion hole 12d, an abutting and retaining wall 12e is formed which serves as a coming-off preventing plate portion that abuts against and engages a stepped portion 15b of the stopper 15 which will be described later. In that portion of the attaching clip 14 which projects from the surface of the grommet 12, a panel engaging portion 14a is formed, and the grommet 12 is attached to the vehicle body panel 11 as the panel engaging portion 14a is fitted in the clip engaging hole 11a of the vehicle body panel 11. The side of the grommet 12 which is away from the vehicle body panel 11 is covered with a protector panel 16, and this protector panel 16 is secured to the vehicle body panel 11 side by fixing members such as screws.

Figure 3A:
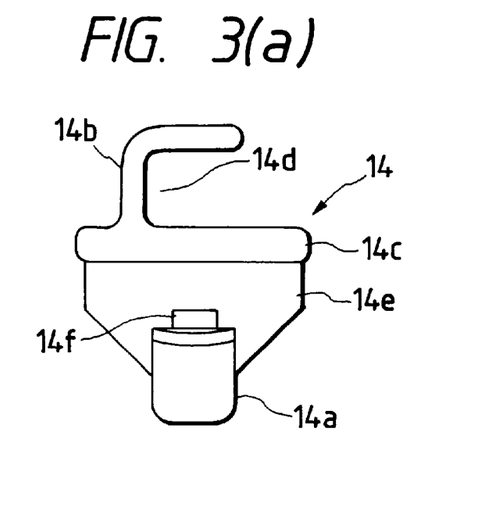
FIG. 3(a) is a front elevational view of the attaching clip in accordance with this embodiment.
Figure 3B:
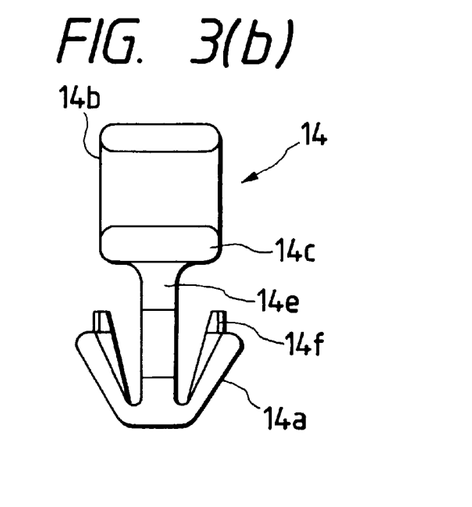
FIG. 3(b) is a side elevational view thereof.
Figure 3C:
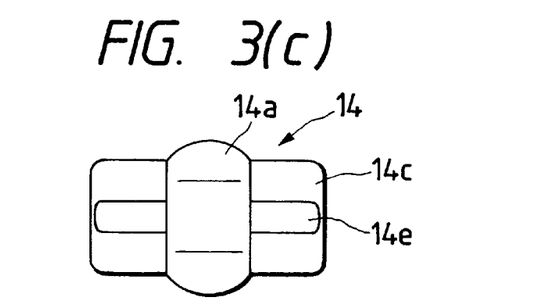
FIG. 3(c) is a plan view thereof.

Next, referring to FIGS. 3(a) to 3(c), a description will be given of the arrangement of the attaching clip 14 made of a synthetic resin. FIG. 3(a) is a front elevational view of the attaching clip 14, FIG. 3(b) is a side elevational view, and FIG. 3(c) is a plan view. As shown in the drawings, a stopper engaging portion 14b is formed in an end portion of the attaching clip 14 which is inserted into the clip embedding hole 12c of the grommet 12. This stopper engaging portion 14b is formed substantially in a U-shape on one side surface of a seat plate 14c of the attaching clip 14, and has an insertion cavity 14d into which the stopper 15 is inserted. Meanwhile, on the other side surface of the seat plate 14c, a support plate 14e having substantially the same width as the seat plate 14c is formed uprightly, and the panel engaging portion 14a is formed on a top portion of this support plate 14e. As shown in FIG. 3(b), this panel engaging portion 14a is formed laterally of the support plate 14e such that a pair of plate pieces respectively having repulsive forces spread diagonally downward from the top portion of the support plate 14e toward the seat plate 14c. A pair of step pieces 14f are each formed at a distal edge of each plate piece of the panel engaging portion 14a on the seat plate 14c side, and these step pieces 14f are adapted to abut against and engage inner walls of the opening of the clip engaging hole 11a in a state in which the panel engaging portion 14a is engaged in the clip engaging hole 11a. This panel engaging portion 14a is adapted to engage in the clip engaging hole 11a of the vehicle body panel 11 by being pressed into it. Namely, the plate pieces are bent in such a manner as to approach each other in the state of being inserted in the clip engaging hole 11a, and after the plate pieces of the panel engaging portion 14a then finishes passing through the clip engaging hole 11a, the plate pieces return to their original state from the bent state, thereby allowing the panel engaging portion 14a to be engaged so as not to come off the vehicle body panel 11. It should be noted that since the step pieces 14f abut against and engage the inner walls of the opening of the clip engaging hole 11a, in a case where a force for pulling the grommet 12 away from the vehicle body panel 11 has acted upon the grommet 12 with the attaching clip 14 fitted therein, the panel engaging portion 14a formed substantially in a chevron shape is prevented from spreading out, thereby making it possible to prevent the panel engaging portion 14a from becoming damaged.

Figure 4:
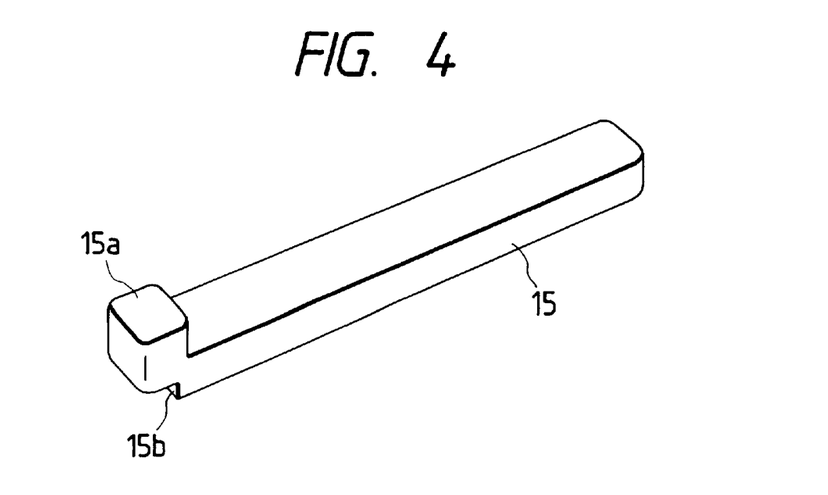
FIG. 4 is a perspective view of a stopper in accordance with this embodiment.

In addition, the stopper 15 is formed of a synthetic resin in the same way as the attaching clip 14, as described above. As shown in FIG. 4, the shape of this stopper 15 is substantially bar shaped, and a bent portion 15a which is bent in a direction perpendicular to the inserting direction is formed at a rear end, in a stopper-inserting direction, of the stopper 15. The stepped portion 15b is formed at a corner portion of this bent portion 15a.

Figure 5A:
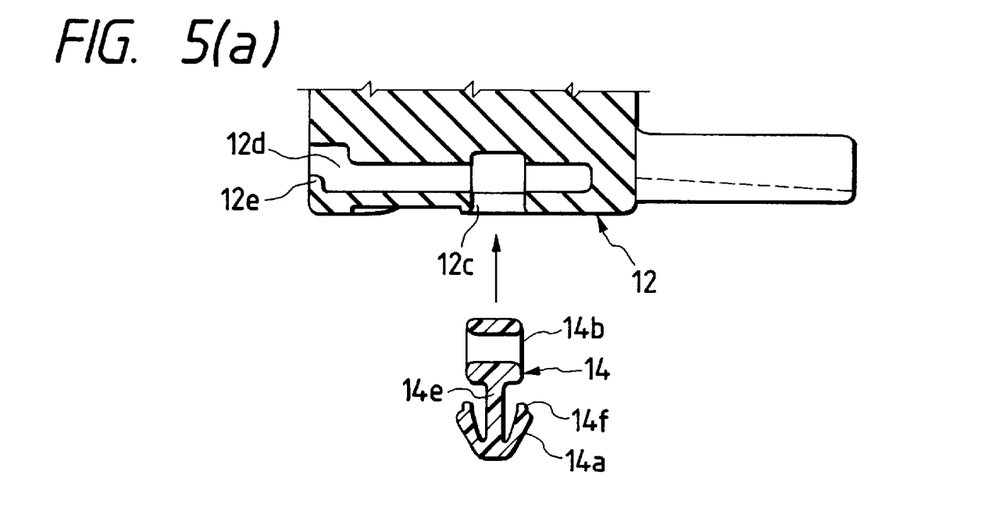
FIGS. 5(a) to 5(c) are explanatory cross-sectional views illustrating a method for fitting the attaching clip and the stopper with respect to the grommet in accordance with this embodiment.
Figure 5B:
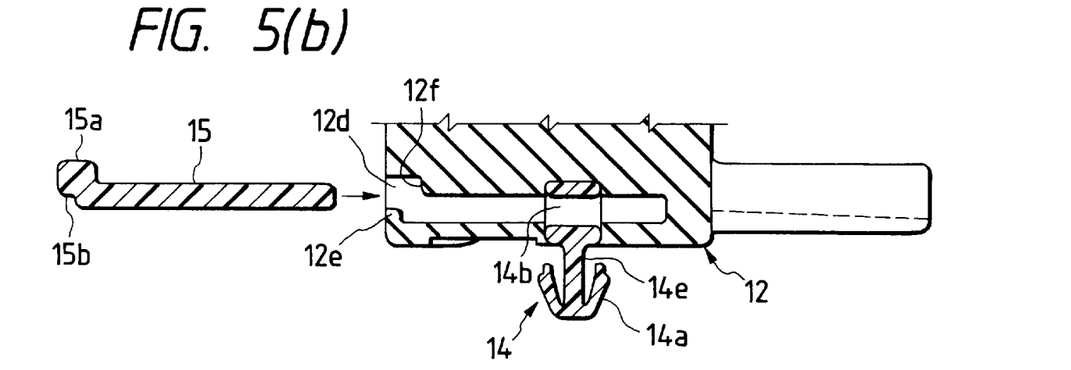
Figure 5C:
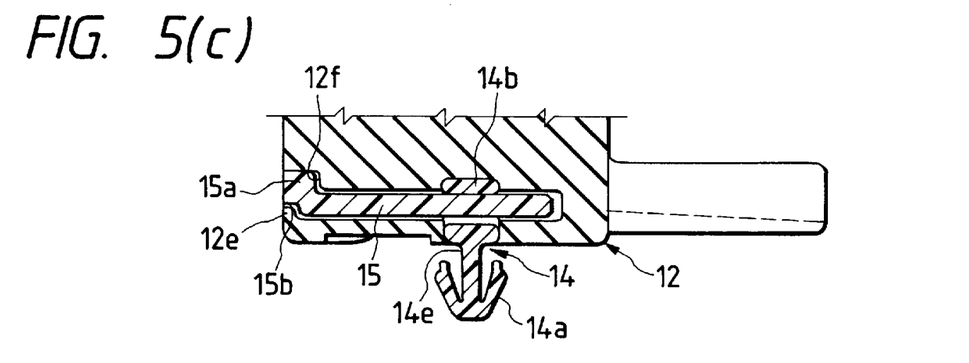

Referring to FIGS. 5(a) to 5(c), a description will be given of a method for fitting the attaching clip 14 and the stopper 15 with respect to the grommet 12. First, as shown in FIG. 5(a), the stopper engaging portion 14b of the attaching clip 14 is inserted into the clip embedding hole 12c of the grommet 12. Next, as shown in FIG. 5(b), the stopper 15 is inserted into the stopper insertion hole 12d. In conjunction with this insertion, a distal end, in the stopper-inserting direction, of the stopper 15 is fitted to the stopper engaging portion 14b of the attaching clip 14 in the innermost portion of the stopper insertion hole 12d. Consequently, the stopper 15 prevents the attaching clip 14 from coming off the grommet 12. Further, upon completion of the insertion of the stopper 15, as shown in FIG. 5(c), the abutting and retaining wall 12e formed at the opening edge of the stopper insertion hole 12d abuts against and engages the stepped portion 15b of the stopper 15 so as to prevent the stopper 15 from coming off the grommet 12. Further, a front face, in the stopper-inserting direction, of the bent portion 15a of the stopper 15 abuts against and engages the stepped portion 12f formed on the inner wall of the stopper insertion hole 12d, and is thereby prevented from being inserted excessively.

Figure 6:
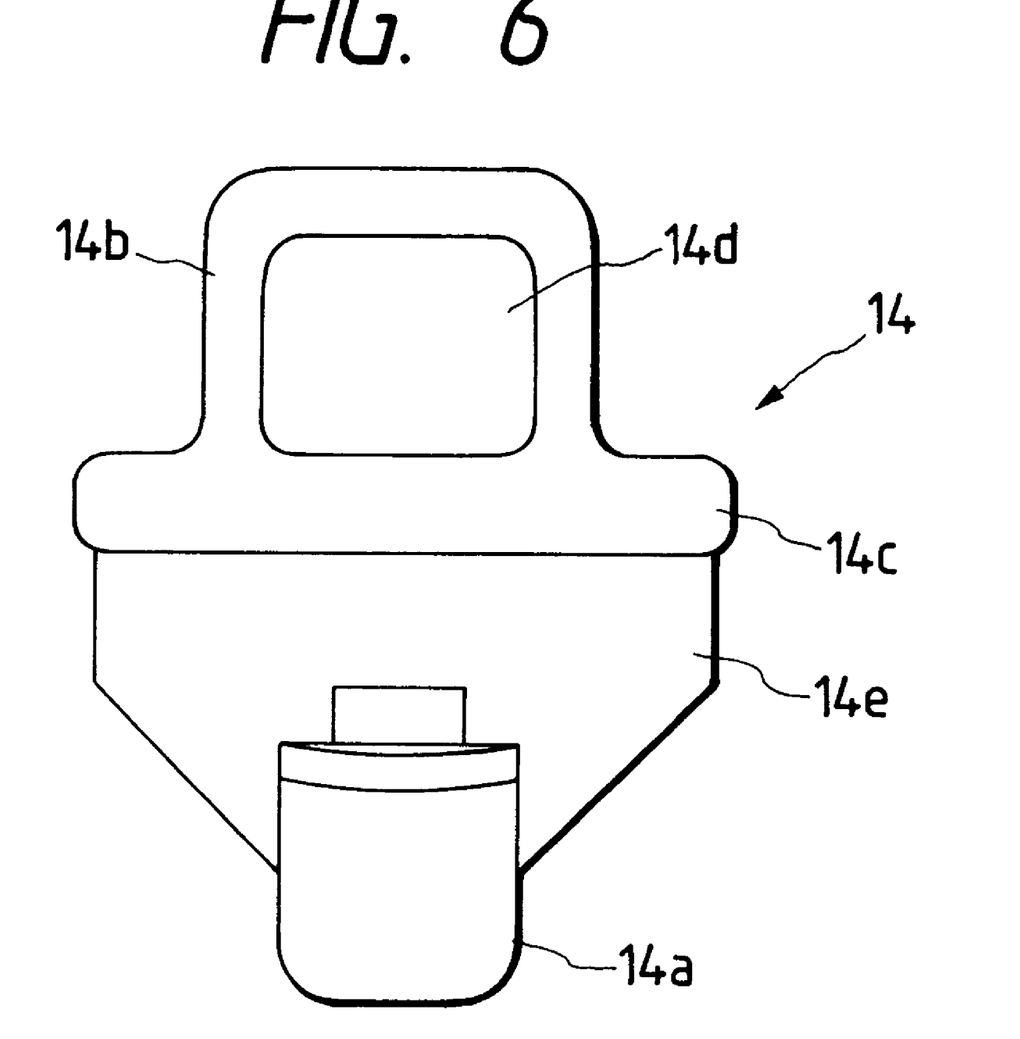
FIG. 6 is a front elevational view illustrating a modification of the attaching clip.

Although a description has been given of the structure for attaching a rubber-made component part in accordance with this embodiment, the present invention is not limited to the same, and various changes in design are possible in conformity with the gist of the arrangement. For example, although in the above-described embodiment the panel engaging portion 14b of the attaching clip 14 is formed substantially in a U-shape, the panel engaging portion 14b may be of such a shape as to surround the stopper insertion gap 14d, as shown in FIG. 6. Further, as for the structure of the panel engaging portion 14a of the attaching clip 14 as well, it is possible to adopt various engaging structures. In addition, although the grommet 12 is used as the rubber-made component part in the above-described embodiment, it goes without saying that the present invention is also applicable to other rubber-made component parts.

What is claimed is:

1. An attaching structure, comprising:

a main body having a clip embedding hole and a stopper insertion hole which communicate with each other;

an attaching clip having one end portion insertable into the clip embedding hole and the other end portion projecting from a surface of the main body when the one end portion is inserted into the clip embedding hole;

a stopper engaging portion formed on the one end portion of the attaching clip;

a panel engaging portion formed on the other end portion of the attaching clip; and a stopper insertable into the stopper insertion hole, and adaptable to engage with the stopper engaging portion of the attaching clip, wherein the panel engaging portion of the attaching clip is engageable with a clip engaging portion of a panel.

2. The structure of claim 1, wherein the attaching clip is retained in the clip embedding hole when the stopper engages with the stopper engaging portion of the attaching clip.

3. The structure of claim 2, wherein said stopper engaging portion includes a stopper receiving portion, into which the stopper is insertable.

4. The structure of claim 3, wherein the panel is a vehicle body panel.

5. The structure of claim 1, wherein the main body is a grommet.

6. The structure of claim 5, wherein the panel is a vehicle body panel.

7. The structure of claim 1, wherein said stopper engaging portion includes a stopper receiving portion, into which the stopper is insertable.

8. The structure of claim 7, wherein the panel is a vehicle body panel.

9. The structure of claim 7, wherein a coming-off preventing plate portion which abuts against and engages a rear end, in a stopper-inserting direction, of the stopper, is formed integrally with an opening portion of the stopper insertion hole.

10. The structure of claim 1, wherein the clip engaging portion of the panel is an opening portion.

11. The structure of claim 1, the clip engaging portion of the panel being an opening portion formed in the panel, wherein the panel engaging portion of the attaching clip is insertable into the opening portion of the panel.

12. The structure of claim 11, wherein the panel engaging portion of the attaching clip has a resilient piece, and wherein the panel engaging portion of the attaching clip is insertable into the opening portion while the resilient piece of the panel engaging portion of the attaching clip is adapted to be press-fitted into the opening portion, and the resilient piece spreads out after the insertion of the panel engaging portion into the opening portion.

13. The structure of claim 1, wherein a coming-off preventing plate portion which abuts against and engages a rear end, in a stopper-inserting direction, of the stopper, is formed integrally with an opening portion of the stopper insertion hole.

14. The structure of claim 1, wherein the panel is a vehicle body panel.

15. The structure of claim 1, wherein said main body is made of rubber.

16. The structure of claim 1, wherein said attaching clip is made of resin.

* * * * *